(12) United States Patent
Ajbani et al.

(10) Patent No.: US 8,648,155 B2
(45) Date of Patent: *Feb. 11, 2014

(54) POLYETHER ETHER KETONE/POLYPHENYLENE SULFIDE BLEND

(75) Inventors: Manoj Ajbani, Mason, OH (US); Andrew Auerbach, Livingston, NJ (US); Ke Feng, Cincinnati, OH (US)

(73) Assignee: Ticona LLC, Florence, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/457,574

(22) Filed: Apr. 27, 2012

(65) Prior Publication Data

US 2012/0217038 A1 Aug. 30, 2012

Related U.S. Application Data

(63) Continuation of application No. 12/106,110, filed on Apr. 18, 2008, now Pat. No. 8,168,732, which is a continuation-in-part of application No. PCT/US2006/041196, filed on Oct. 20, 2006.

(51) Int. Cl.
*C08F 283/00* (2006.01)
*C08G 65/48* (2006.01)

(52) U.S. Cl.
USPC ........... 525/537; 525/390; 525/394; 528/125; 528/387

(58) Field of Classification Search
USPC .................. 525/537, 390, 394; 528/125, 387
See application file for complete search history.

(56) References Cited

U.S. PATENT DOCUMENTS

| | | | |
|---|---|---|---|
| 3,354,129 A | 11/1967 | Edmonds | |
| 3,919,177 A | 11/1975 | Campbell | |
| 4,368,321 A | 1/1983 | Sherk et al. | |
| 4,371,671 A | 2/1983 | Anderson | |
| 4,421,588 A | 12/1983 | Davies | |
| 4,474,174 A * | 10/1984 | Petruzzi | 600/104 |

(Continued)

FOREIGN PATENT DOCUMENTS

| | | |
|---|---|---|
| DE | 19836787 | 6/1952 |
| EP | 0372744 A2 | 6/1990 |

(Continued)

OTHER PUBLICATIONS

Translation of JP 04132765.*

(Continued)

*Primary Examiner* — Mike M Dollinger
(74) *Attorney, Agent, or Firm* — Dority & Manning, P.A.

(57) ABSTRACT

The present description discloses a polymeric composition which is a melt-processed alloy comprised of (a) a polyarylene sulfide resin, (b) a polyaryl-ether-ketone resin, and a reactive compound which results in (c) a graft copolymer of the polyarylene sulfide resin and/or the polyaryl-ether-ketone resin in addition to the starting resins. Exemplary melt-processed polymeric compositions can be made by reacting an alkoxy silane with the polyarylene sulfide resin and/or the polyaryl-ether-ketone resin to produce a graft copolymer of a portion of one or both of the resins, sufficient to render the composition uniform and homogeneous. It is normally preferred for the exemplary organosilane compound, to be an amino silane. The subject invention further reveals an insulated wire comprising (1) an electrical conductor and (2) a layer of the melt-processed alloy composition; and fiber reinforced composites comprising fibers substantially fully impregnated with the alloy polymeric composition.

14 Claims, 1 Drawing Sheet

(56) References Cited

U.S. PATENT DOCUMENTS

| | | |
|---|---|---|
| 4,588,546 A | 5/1986 | Fell et al. |
| 4,600,789 A | 7/1986 | Sugerman et al. |
| 4,684,699 A | 8/1987 | Robeson |
| 4,690,972 A | 9/1987 | Johnson et al. |
| 4,814,430 A | 3/1989 | Iwasaki et al. |
| 4,873,283 A | 10/1989 | Satake et al. |
| 4,889,893 A | 12/1989 | Kobayashi et al. |
| 4,895,892 A | 1/1990 | Satake et al. |
| 4,895,912 A | 1/1990 | Satake et al. |
| 4,910,086 A | 3/1990 | Kawakami et al. |
| 4,935,473 A | 6/1990 | Fukuda et al. |
| 4,975,479 A | 12/1990 | Satake et al. |
| 5,079,290 A | 1/1992 | Wright |
| 5,095,078 A | 3/1992 | Mizuno et al. |
| 5,148,569 A * | 9/1992 | Jailor et al. ............ 15/41.1 |
| 5,149,731 A | 9/1992 | Uota et al. |
| 5,223,585 A | 6/1993 | Mizuno et al. |
| 5,256,715 A | 10/1993 | Harry |
| 5,286,814 A | 2/1994 | Mizuno et al. |
| 5,288,834 A | 2/1994 | Roovers et al. |
| 5,300,552 A | 4/1994 | Hindi et al. |
| 5,344,914 A | 9/1994 | Gibson et al. |
| 5,352,768 A | 10/1994 | Stuber et al. |
| 5,380,783 A | 1/1995 | Satake et al. |
| 5,442,029 A | 8/1995 | Gibson et al. |
| 5,625,002 A | 4/1997 | Kadoi et al. |
| 5,695,869 A | 12/1997 | Auerbach et al. |
| 5,840,830 A | 11/1998 | Miyahara et al. |
| 6,538,098 B1 | 3/2003 | Goldfinger |
| 6,608,136 B1 | 8/2003 | Dean et al. |
| 6,794,032 B2 | 9/2004 | Borgner et al. |
| 6,870,064 B2 | 3/2005 | Agostini et al. |
| 6,881,816 B2 | 4/2005 | Gharda et al. |
| 6,949,288 B2 | 9/2005 | Hodge et al. |
| 7,034,187 B2 | 4/2006 | Partiban |
| 7,060,326 B2 | 6/2006 | Heil |
| 8,129,462 B2 * | 3/2012 | Hsu et al. ............ 524/494 |

FOREIGN PATENT DOCUMENTS

| | | |
|---|---|---|
| EP | 0594188 A | 4/1994 |
| EP | 0756536 A1 | 10/1995 |
| GB | 2355464 | 4/2001 |
| JP | 4132765 A | 5/1992 |
| WO | WO 2008048266 A1 | 4/2008 |

OTHER PUBLICATIONS

Search Report for International Application No. PCT/US2006/041196 dated Mar. 19, 2007.

* cited by examiner

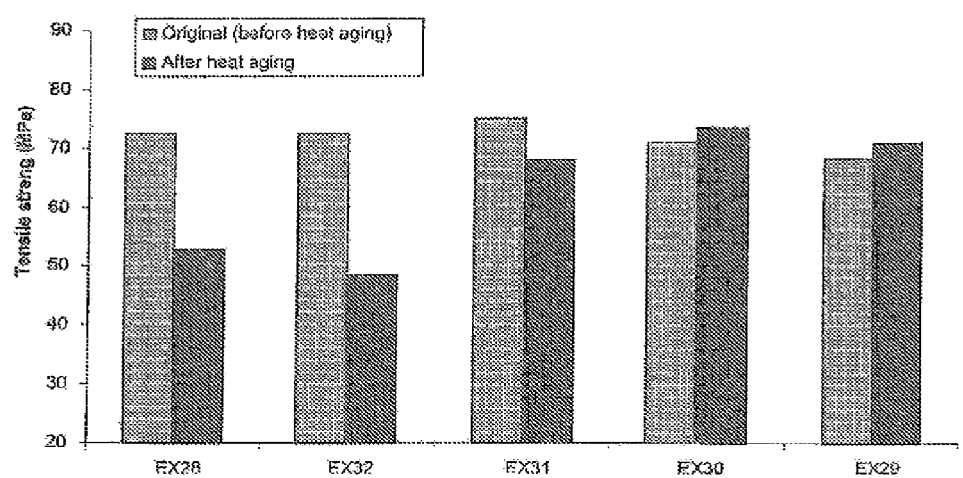

POLYETHER ETHER KETONE/POLYPHENYLENE SULFIDE BLEND

RELATED APPLICATIONS

The present application is a continuation of U.S. application Serial No. 12/106,110. filed on Apr. 18, 2008. which claims the benefit under 35 U.S.C. 120 of Filing Number PCT/US2006/041196 filed in the USRO on Oct. 20, 2006 which are incorporated herein in their entirety by reference thereto.

BACKGROUND OF THE INVENTION

Wires that are used in applications that involve exposure to high temperatures are typically coated with relatively expensive polymers, such as fluoropolymers or polyether ether ketone (PEEK). Less expensive polymers normally fail to provide the combination of physical properties, chemical resistance, and thermal resistance that are demanded in such applications. For instance, polyphenylene sulfide (PPS), a specific type of polyarylene sulfides, possesses many of the needed characteristics for utilization in coating wires, but has a maximum continuous use temperature (CUT) of only about 170° C. More specifically, PPS offers excellent solvent, chemical, and heat resistance. It also possesses high strength, stiffness and low elongation at yield and break. However, PPS cannot be used in coating wires that are utilized in applications involving exposure to high temperatures without compromising the maximum continuous use temperature of the wire.

U.S. Pat. No. 6,608,136 discloses a polyphenylene sulfide alloy composition for wire and cables that comprises 40 to 90% by weight of PPS, about 1 to about 20% of an ethylene based grafting agent with grafting groups selected from unsaturated epoxide, unsaturated isocyanate, silane, or an oxazoline, and another ethylene copolymer with carboxylic acid containing groups. However, such compositions do not provide adequate high temperature resistance for utilization in many wire coating applications.

U.S. Pat. No. 4,421,588 discloses a plastics alloy for a bearing material comprising polyphenylene sulphide and polyether ether ketone. The alloy is formed by powder mixing, melt blending or solvent blending and applied to a metal backing either as a sheet, or in solution or in powder form. The alloy is heated and roll bonded to the backing.

U.S. Pat. No. 4,684,699 discloses an alloy comprising from about 2 to about 98 weight percent of a poly(arylene sulfide) and from about 98 to about 2 weight percent of a crystalline poly(aryl ether ketone).

U.S. Pat. No. 4,690,972 discloses compositions comprising a poly(arylene sulfide) which crystallizes to a fine-grained crystalline morphology. A method is also provided for treating compositions comprising a poly(arylene sulfide) by incorporation of a crystalline morphology altering additive, heating the resulting mixture above the melting point of the poly(arylene sulfide) and cooling the mixture at a rate of less than 50° C. per minute.

U.S. Pat. No. 5,095,078 discloses a heat-resistant film obtained by biaxially-stretching a composition which comprises (A) 50-90 parts by weight of a polyether ether ketone having predominant recurring units of the formula:

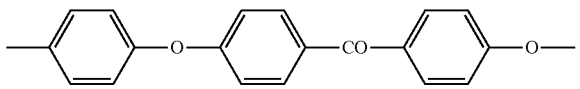

and (B) 50-10 parts by weight of a substantially linear poly (arylene sulfide) having melt viscosity of at least 1,000 poises. A production process of such a heat-resistant film is also disclosed, which comprises biaxially stretching the above composition in a temperature range at least equal to the crystallization temperature (Tc) of the poly(arylene sulfide) but not higher than the crystallization temperature (Tc) of the polyether ether ketone.

U.S. Pat. No. 5,223,585 discloses a heat-resistant film obtained by biaxially-stretching a composition which comprises (A) 50-90 parts by weight of a polyether ether ketone having predominant recurring units of the formula:

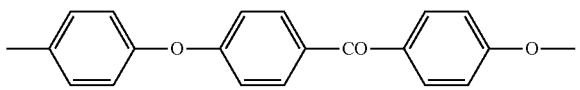

and (B) 50-10 parts by weight of a substantially linear poly (arylene sulfide) having melt viscosity of at least 1,000 poises.

U.S. Pat. No. 5,286,814 discloses a heat-resistant stretched film that is obtained by stretching a resin composition comprising 100 parts by weight of a poly(arylene sulfide) of a substantially linear structure and 5 to less than 100 parts by weight of a melt-stable poly(arylene thioether-ketone).

U.S. Pat. No. 5,079,290 describes a blend of polyarylene sulfide and polyetherether ketone at a low level up to 3% by weight for increased nucleation. The patent does not suggest that the upper use temperature of polyarylene sulfide can be increased by this small addition of polyarylene ether ketone.

U.S. Pat. No. 4,935,473 describes a composition comprising 100 parts of polyphenylene sulfide and a small amount of another thermoplastic polymer that includes a polyarylether ketone. The patent does not teach that the upper use temperature can be increased by higher PEEK additions and by using a PPS of higher sodium end group concentration.

U.S. Pat. No. 5,256,715 describes a polyarylene sulfide composition containing one azidosilane compound and an optional nucleating agent. Unfortunately, the levels required for nucleation are small and do not suggest the increase the continuous use temperature of the polyarylene sulfide.

U.S. Pat. No. 5,300,552 describes a polyarylene sulfide composition with a polyether ether ketone included as a nucleating agent at levels of up to 2% by weight. At these low amounts of polyether ether ketone (PEEK), an increase in the upper use temperature of the polyarylene sulfide is not possible.

U.S. Pat. No. 5,352768 describes a process for producing polyarylene sulfide polymer. Addition of PEEK at less than 1% is suggested for facilitating nucleation which is considered ineffective in increasing the upper use temperature of PPS and improving the tensile strength of the blend of polyarylene sulfide and polyether ether ketone.

There is currently a need for a less expensive polymer composition for coating wires that are used in applications that involve exposure to high temperatures for extended periods of time. Such a composition should possess good tensile properties, modulus, chemical resistance, and flexibility in addition to good thermal characteristics, as exemplified by a high continuous use temperature. It would be particularly desirable to utilize poly-aryl-ether-ketone in amounts that are high enough to improve the continuous use temperature, yet not high enough to increase the cost appreciably. It is also important for such a polymeric composition to be capable of being processed using standard wire coating procedures and equipment.

SUMMARY OF THE INVENTION

This invention relates to a melt-processed polymeric composition resulting in improved retention of properties rendering it well-suited for shaped articles exposed to high temperatures for extended periods of time in-service. These properties include good tensile strength, modulus, chemical resistance, and flexibility as well as good thermal characteristics.

The present invention more specifically discloses a melt-processed polymeric composition prepared by combining (a) a polyarylene sulfide resin, (b) a polyaryl-ether-ketone resin, and certain organofunctional silanes which undergoes a chemical reaction under heat and shear to form a graft copolymer of the polyarylene sulfide resin and/ or polyaryl-ether-ketone resin. The polyarylene sulfide resin can have a metal endgroup content and a total residual chlorine content within specified ranges. In general, the residual chlorine content of the polyarylene sulfide resin can be from about 300 ppm to about 1200 ppm.

The metal endgroup content of the polyarylene sulfide resin can generally vary from 50 ppm to 2000 ppm. In one embodiment, extraordinary improvements are achieved with amounts of a polyaryl-ether-ketone resin from 45 wt. % down to 15 wt. % when melt processed with polyarylene sulfide resin having a metal endgroup content of 270 ppm to 2000 PPM. For example, in one particular embodiment, the metal endgroup content can be from 270 ppm to 1400 ppm. Particularly surprising is the improvement in tensile strength retention properties when the melt-processed mixture contains polyarylene sulfide resin having the above described metal endgroup content with from 15 to 40 wt. % of the polyaryl-ether-ketone.

In one embodiment, from 10 to 40 wt % polyarylene sulfide resin is melt-processed with from 60 wt. % to 90 wt. % polyaryl-ether-ketone resin and up to about 2 wt % of a reactive compound to form the melt processed composition having improved tensile strength retention where the metal endgroup content of the polyarylene sulfide resin is from about 50 ppm to about 900 ppm.

The subject invention is also directed to shaped articles formed from the melt-processed composition. The shaping processes involve a further additional melt-processing history on the material. Exemplary shaped articles include insulated wires comprising (1) an electrical conductor, and (2) an outer layer of the instant melt-processed polymeric composition surrounding the electrical conductor, wherein the polymeric composition is comprised of the melt-processed reaction product of (a) polyarylene sulfide resin, and (b) polyaryl-ether-ketone resin, which results in (c) a graft copolymer of the polyarylene sulfide resin and/or the polyaryl-ether-ketone resin.

The present invention also discloses a polymeric composition exhibiting a continuous phase and discontinuous phase. In some embodiments, the continuous phase is comprised of (a) a polyarylene sulfide resin, and in other embodiments, the continuous phase comprises (b) a polyaryl-ether-ketone resin. The resulting graft polymer of (a) and/or (b) is essential in the ability to form a homogenous mass and is believed to represent polyarylene sulfide chains having polyaryl-ether-ketone chains grafted thereto, and/or the reaction product of polyaryl-ether-ketone and an alkoxysilane.

The present invention further discloses a process for preparing a shaped article by molding, spinning, and extrusion methods which comprises subjecting the starting materials to heat and shear in the melt-phase to form a uniform reaction mixture. The reaction mixture is capable of injection molding, extrusion, spinning to form improved shaped articles. The polymeric composition resulting from melt-processing conditions comprises (a) a polyarylene sulfide resin, (b) a polyaryl-ether-ketone resin, and (c) a graft copolymer of the polyarylene sulfide resin and/or the polyaryl-ether-ketone resin formed by reaction of an organosilane.

The present invention further discloses a coated metal body comprising a metal base or a metal base having an undercoat of an inorganic and/or organic material and at least one coating layer formed on the metal base or the undercoat, wherein the coating layer has a thickness which is within the range of 5 μm to 1 000 μm, and where in coating layer is comprised of a polymeric composition which is comprised of (a) polyarylene sulfide resin, (b) polyaryl-ether-ketone resin, and (c) a graft copolymer of the polyarylene sulfide resin and/or the polyaryl-ether-ketone resin.

The present invention further discloses a polymeric composition which is comprised of (a) a polyarylene sulfide resin, (b) a polyaryl-ether-ketone resin, and a graft copolymer of (a) and (b) wherein said graft copolymer has a graftlinking group comprising a residue selected from (i), (ii) and (iii), wherein:

(i) has the structure:

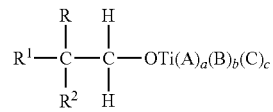

wherein R and $R^1$ can be the same or different and represent a monovalent alkyl, alkenyl, alkynyl, aralkyl, aryl or alkaryl group of 1 to 20 carbon atoms, or an ether substituted derivative thereof, or a halogen, wherein $R^2$ represents a monovalent alkyl, alkenyl, alkynyl, aralkyl, aryl or alkaryl group of 1 to 20 carbon atoms, or an ether substituted derivative thereof, or an oxy derivative or an ether substituted oxy derivative thereof or a halogen, wherein A, B and C represent a monovalent aroxy group, a thioaroxy group, a diester phosphate group, a diester pyrophosphate group, a oxyalkylamino group, a sulfonyl group, or a carboxyl group, wherein a, b, and c represent integers, and wherein the sum of a, b, and c is 3;

(ii) has the structure:

$$(R^1\text{---}O\text{---})_y\text{---}X\text{---}(\text{---}O\text{---}R^2\text{---}W)_z$$

wherein each $R^1$ represents an alkyl radicals having from 1 to 8 carbon atoms, wherein $R^2$ represents a divalent radical selected from the group consisting of alkylenes having 1 to 15 carbon atoms, arylene and alkyl substituted arylene groups having 6 to 10 carbon atoms, wherein W represents an epoxy group; wherein y represents an integer of from 1 to 3, wherein z represents an integer from 1 to 3, wherein the sum of y and z equals 4, and wherein X represents titanium or zirconium; and (iii) has the structure:

$$Z\text{-Alk-}S_n\text{-Alk-}Z \qquad (I)$$

in which Z is selected from the group consisting of

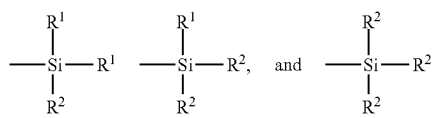

where $R^1$ is an alkyl group of 1 to 4 carbon atoms, cyclohexyl or phenyl; wherein $R^2$ is alkoxy of 1 to 8 carbon atoms, or cycloalkoxy of 5 to 8 carbon atoms; and wherein Alk is a divalent hydrocarbon of 1 to 18 carbon atoms and n is an integer of 2 to 8.

BRIEF DESCRIPTION OF THE DRAWINGS

FIG. 1 is a graphical representation of the results obtained in Examples 28 through 32.

DETAILED DESCRIPTION OF THE INVENTION

The polyarylene sulfide resins that can be used in the present invention are comprised of repeating units represented by the formula: —(—Ar—S—)— wherein Ar is an arylene group. Such unfilled or unreinforced polyarylene sulfides are characterized by having excellent high temperature properties. The thermal resistance properties of polyarylene sulfide are improved by the practice of the invention, in particular increases in the thermal endurance of the polyarylene sulfide compositions are exhibited which is critical for expanding their performance envelope, without increasing the cost substantially. The polyarylene sulfide resins that are useful in this invention will typically have a metal end group content of from about 50 ppm to about 2000 ppm. The metal endgroup content of the polyarylene sulfide resin, for instance, can be selected depending upon the particular application and the relative amounts of components contained in the polymer composition.

For example, when the polymer composition contains relatively low amounts of the polyaryl-ether-ketone resin, the metal endgroup content of the polyarylene sulfide resin can generally be greater than about 270 ppm. For example, in these applications, the metal endgroup content of the polyarylene sulfide resin can be from about 270 ppm to about 2000 ppm, such as from about 270 ppm to about 900 ppm. The present inventors unexpectedly discovered that, in certain applications, by maintaining the metal endgroup content of the polyarylene sulfide resin above 270 ppm can result in the production of a polymer composition that has dramatically improved tensile retention properties.

When the polymer composition of the present disclosure contains greater amounts of the polyaryl-ether-ketone resin, on the other hand, the metal endgroup content of the polyarylene sulfide resin can be relatively low, such as from about 50 ppm to about 1400 ppm, such as from about 50 ppm to about 900 ppm. When the polyarylene sulfide resin contains a relatively low metal endgroup content and is combined with proportionally greater amounts of the polyaryl-ether-ketone resin, polymer compositions can be made according to the present disclosure that have unexpectedly improved strength properties, such as tensile strength and tensile elongation.

The polyarylene sulfide resin will typically have a metal endgroup wherein the metal is an alkali metal selected from the group consisting of sodium, lithium, and potassium. It is typically preferred for the metal end group to be a sodium end group. U.S. Pat. No. 5,625,002 describes the process for providing desired levels of sodium end groups by means of different washing techniques. The teachings of U.S. Pat. No. 5,625,002 are incorporated by reference herein in their entirety. For purposes of this invention, metal end group contents are measured by the Inductively Coupled Plasma-Optical Emission Spectroscopy technique used on samples of the polyarylene sulfide that have been digested in a mixture of nitric acid and sulfuric acid as known to persons skilled in the arts.

Examples of arylene groups that can be present in the polyarylene sulfide resin include p-phenylene, m-phenylene, o-phenylene and substituted phenylene groups (wherein the substituent is an alkyl group preferably having 1 to 5 carbon atoms or a phenyl group), p,p'-diphenylene sulfone, p,p'-biphenylene, p,p'-diphenylene ether, p,p'-diphenylenecarbonyl and naphthalene groups.

Although an arylene sulfide homopolymer constituted of the same repeating units among the arylene sulfide groups described above may be used in the present invention, the use of a copolymer constituted of a plurality of repeating units different from each other is preferable in some cases with respect to the processability of the resulting composition. In particular, a homopolymer composed of p-phenylene sulfide repeating units having a high degree of linearity is preferably used.

The copolymer to be used in the present invention may be any one constituted of two or more repeating units selected from among the arylene sulfide units mentioned above. In particular, a copolymer comprising p-phenylene sulfide units and m-phenylene sulfide units is preferably used. More particularly, it is suitable with respect to heat resistance, moldability, mechanical characteristics and so on to use a copolymer having a high degree of linearity which is comprising at least 60 mole percent, preferably at least 70 mole percent of p-phenylene sulfide units. Further, it is preferable that the copolymer contain 5 to 40 mole percent, still preferably 10 to 25 mole percent of m-phenylene sulfide units. The polyphenylene sulfide resin can be a block copolymer.

The polyarylene sulfide resin that can be used in practice of the present invention may be a polymer having improved molding processability by crosslinking a relatively low-molecular polymer oxidatively or thermally to increase its melt viscosity, or a polymer having a high degree of linearity prepared by the polycondensation of a monomer component mainly comprising a difunctional monomer. In many cases, the latter polymer is superior to the former with respect to the physical properties of the resulting molded article.

According to the present invention, a resin composition may be used which is prepared by blending a crosslinked polyarylene sulfide resin prepared from a monomer having at least three functional groups as a part of the monomer component with the polymer having a high degree of linearity as described above. Polyphenylene sulfide resins are considered to have a high degree of linearity in cases where they exhibit a complex melt viscosity of less than 13,000 poise at 310° C. and 0.1 rad/sec. It is preferred for polyphenylene sulfide resins having a high degree of linearity to exhibit a complex melt viscosity of less than 13,000 poise at 310° C. and 0.1 rad/sec. For purposes of this invention the melt viscosity of the polyphenylene sulfide resin can be determined with an ARES® strain-controlled rheometer (from TA Instruments) operated in dynamic (oscillatory) shear mode using parallel plate geometry with 25 mm disks and a frequency of 0.1 rad/sec at 310° C. For a PPS having a high degree of linearity as defined above per the ARES® rheometer, the corresponding melt viscosity as measured in a capillary rheometer at 310° C., 1200 1/s shear rate will be preferably below 6500 poise.

The polyarylene sulfides that are useful in the practice of this invention include polyarylene thioethers containing repeat units of the formula:

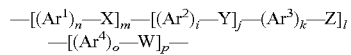

wherein $Ar^1$, $Ar^2$, $Ar^3$, and $Ar^4$ are the same or different and are arylene units of 6 to 18 carbon atoms; W, X, Y, and Z are the same or different and are bivalent linking groups selected from $-SO_2-$, $-S-$, $-SO-$, $-CO-$, $-O-$, $-COO-$ or alkylene or alkylidene groups of 1 to 6 carbon atoms and wherein at least one of the linking groups is $-S-$; and n, m, i, j, k, l, o, and p are independently zero or 1, 2, 3, or 4, subject to the proviso that their sum total is not less than 2. The arylene units $Ar^1$, $Ar^2$, $Ar^3$, and $Ar^4$ may be selectively substituted or unsubstituted. Advantageous arylene systems are phenylene, biphenylene, naphthylene, anthracene and phenanthrene. The polyarylene sulfide typically includes at least 30 mole percent, particularly at least 50 mole percent and more particularly at least 70 mole percent arylene sulfide ($-S-$) units. Preferably the polyarylene sulfide polymer includes at least 85 mole percent sulfide linkages attached directly to two aromatic rings. Advantageously the polyarylene sulfide polymer is polyphenylene sulfide (PPS), defined herein as containing the phenylene sulfide structure $-(C_6H_4-S)_n-$ (wherein n is an integer of 1 or more) as a component thereof.

The polyarylene sulfide resin used in the practice of this invention will typically be polyphenylene sulfide. Synthesis techniques that can be used in making polyphenylene sulfide resins that are suitable for utilization in the practice of this invention are described in U.S. Pat. Nos. 4,814,430, 4,889,893, 5,380,783, and 5,840,830, the teachings of which are incorporated herein by reference in their entirety.

The polyarylene sulfide resin can be washed with a liquid media. For instance, the polyarylene sulfide resin can optionally be washed with water, acetone, N-methyl-2-pyrrolidone (NMP), a salt solution, an acedic media, such as acetic acid or hydrochloric acid. The polyarylene sulfide resin will typically be washed in a sequential manner that is generally known to persons skilled in the prior art. Washing with an acidic solution or a salt solution may further reduce the sodium, lithium or calcium metal ion end group concentration from about 2000 ppm to about 100 ppm. U.S. Pat. No. 5,625,002 describes several methods of washing PPS. The teachings of U.S. Pat. No. 5,626,002 are incorporated herein by reference in their entirety. Typically, washing with acid or a salt solution will lower the sodium end group concentration. The PPS that is unwashed with acid or a salt solution is highly preferred.

The polyarylene sulfide thermoplastic resin that can also be used in this invention can be semi-linear, branched or slightly crosslinked. A process that can be used in making semi-linear polyarylene sulfide is described in U.S. Pat. Nos. 3,354,129; 3,919,177; 4,371,671, and 4,368,321 the teachings of which are incorporated herein by reference in their entirety.

The polyaryl-ether-ketones that are useful in the practice of this invention include polyetherketones (PEK), polyetheretherketones (PEEK), and polyetherketoneketone (PEKK). The preparation of such polymers is described in U.S. Pat. Nos. 5,288,834, 5,344,914, 5,442,029, 4,684,699, 4,690,972, 6,538,098, 6,566,484, 6,881,816, 7,034,187, and UK Patent Application 2,355,464. The teachings of these patents are incorporated herein by reference with respect to teaching techniques for synthesizing polyaryl-ether-ketone resins that can be utilized in the practice of this invention.

The alkoxy silanes that are useful in this invention are described in U.S. Pat. No. 5,149,731, the teachings of which are incorporated herein by reference in their entirety. The alkoxysilane compound is at feast one silane compound selected from the group consisting of a vinlyalkoxysilanes, epoxyalkoxysilanes, aminoalkoxysilanes, and mercaptoalkoxysilanes. Examples of the vinylalkoxysilane that can be utilized include vinyltriethoxysilane, vinyltrimethoxysilane and vinyltris(β-methoxyethoxy)silane. Examples of the epoxyalkoxysilanes that can be used include γ-glycidoxypropyltrimethoxysilane, β-(3,4-epoxycyclohexyl)ethyltrimethoxysilane and γ-glycidoxypropyltriethoxysilane. Examples of the mercaptoalkoxysilanes that can be employed include γ-mercaptopropyltrimethoxysilane and γ-mercaptopropyltriethoxysilane.

Amino silanes are a preferred class of alkoxy silanes that can be used in the practice of this invention. The amino silane compounds that can be used in the compositions of this invention are typically of the formula: $R^1-Si-(R^2)_3$, wherein $R^1$ is selected from the group consisting of an amino group such as $NH_2$; an aminoalkyl of from about 1 to about 10 carbon atoms, preferably from about 2 to about 5 carbon atoms, such as aminomethyl, aminoethyl, aminopropyl, aminobutyl, and the like; an alkene of from about 2 to about 10 carbon atoms, preferably from about 2 to about 5 carbon atoms, such as ethylene, propylene, butylene, and the like; and an alkyne of from about 2 to about 10 carbon atoms, preferably from about 2 to about 5 carbon atoms, such as ethyne, propyne, butyne and the like; and wherein $R^2$ is an alkoxy group of from about 1 to about 10 atoms, preferably from about 2 to about 5 carbon atoms, such as methoxy, ethoxy, propoxy, and the like. In a preferred embodiment, in the amino silane compound of the $R^1-Si-(R^2)_3$, $R^1$ is selected from the group consisting of aminomethyl, aminoethyl, aminopropyl, ethylene, ethyne, propylene and propyne, and $R^2$ is selected from the group consisting of methoxy groups, ethoxy groups, and propoxy groups.

It is typically preferred for the amino silane compound to be of the formula: $R^3-Si-(R^4)_3$ wherein $R^3$ is an amino group such as $NH_2$ or an aminoalkyl of from about 1 to about 10 carbon atoms such as aminomethyl, aminoethyl, aminopropyl, aminobutyl, and the like, and wherein $R^4$ is an alkoxy group of from about 1 to about 10 atoms, such as methoxy groups, ethoxy groups, propoxy groups, and the like. It is also preferred for the amino silane to be of the formula: $R^5-Si-(R^6)_3$ wherein $R^5$ is selected from the group consisting of an alkene of from about 2 to about 10 carbon atoms such as ethylene, propylene, butylene, and the like, and an alkyne of from about 2 to about 10 carbon atoms such as ethyne, propyne, butyne and the like, and wherein $R^a$ is an alkoxy group of from about 1 to about 10 atoms, such as methoxy group, ethoxy group, propoxy group, and the like. The amino silane can be a mixture of various compounds of the formula $R^1-Si-(R^2)_3$, $R^3-Si-(R^4)_3$, and $R^5-Si-(R^6)_3$.

Some representative examples of amino silane compounds that can be used include aminopropyl triethoxy silane, aminoethyl triethoxy silane, aminopropyl trimethoxy silane, aminoethyl trimethoxy silane, ethylene trimethoxy silane, ethylene triethoxy silane, ethyne trimethoxy silane, ethyne triethoxy silane, aminoethylaminopropyltrimethoxy silane, 3-aminopropyl triethoxy silane, 3-aminopropyl trimethoxy silane, 3-aminopropyl methyl dimethoxysilane or 3-aminopropyl methyl diethoxy silane, N-(2-aminoethyl)-3-aminopropyl trimethoxy silane, N-methyl-3-aminopropyl trimethoxy silane, N-phenyl-3-aminopropyl trimethoxy silane, bis(3-aminopropyl)tetramethoxy silane, bis(3-aminopropyl) tetraethoxy disiloxane, and combinations thereof. The amino silane can also be an aminoalkoxysilane, such as γ-aminopropyltrimethoxysilane, γ-aminopropyltriethoxysilane, γ-aminopropylmethyldimethoxysilane, γ-aminopropylmethyldiethoxysilane, N-(β-aminoethyl)-γ-aminopropyltrimethoxysilane, N-phenyl-γ-aminopropyltrimethoxysilane, γ-diallylaminopropyltrimethoxysilane and γ-diallylaminopropyltrimethoxysilane. A highly preferred amino silane is 3-aminopropyltriethoxysilane which is available from Degussa, Sigma Chemical Company, and Aldrich Chemical Company.

The polymeric composition of this invention will typically be made by blending and reacting from 5 weight percent to 90 weight percent of the polyarylene sulfide, from 5 weight percent to 90 weight percent of the polyetherether ketone, and from 0.1 weight percent to 5 weight percent of a graftlinking agent, such as an alkoxy silane compound. It is normally preferred for the polymeric compositions of this invention to be made by blending 18 weight percent to 83 weight percent of the polyarylene sulfide, from 15 weight percent to 80 weight percent of the polyetherether ketone, and from 0.2 weight percent to 2 weight percent of the alkoxy silane. It is generally more preferred for the polymeric blends of this invention be made by blending 24 weight percent to 74 weight percent of the polyarylene sulfide, from 25 weight percent to 75 weight percent of the polyetherether ketone, and from 0.3 weight percent to 1 weight percent of the alkoxy silane compound. The alkoxy silane will typically be amino silane. The polymer blends of this invention will typically contain at least 5 weight percent of the polyarylene sulfide to result in an appreciable cost savings. Lesser amounts of the polyarylene sulfide can be used with the significant disadvantage of the cost savings not being realized due to the correspondingly high level of the polyetherehter ketone that will be needed. On the other side of the coin the compositions of this invention will include at least 5 weight percent of the polyaryl-ether-ketone resin to effectuate an increase in continuous use temperature that is commercially useful. The polymeric blends of this invention will typically have a polyarylene sulfide phase glass transition temperature which is within the range of 119° C. to 125° C., when measured by the Dynamic Analyzer technique.

In one embodiment, the polyarylene sulfide resin can be selected based upon metal endgroup content so as to minimize the amount of the polyaryl-ether-ketone resin. As described above, when the polymeric composition of the present disclosure contains relatively low amounts of the polyaryl-ether-ketone resin, the metal endgroup content of the polyarylene sulfide resin can, in one embodiment, be greater than about 270 ppm. Having the metal endgroup content of the polyarylene sulfide resin greater than 270 ppm has been found to produce polymeric compositions having surprisingly improved properties, especially thermal retention properties as will be described below. For example, in one embodiment, the polymer composition may contain the polyaryl-ether-ketone resin in an amount from about 15% to about 40% by weight, such as in an amount from about 20% to about 35% by weight. In this embodiment, the polyarylene sulfide resin can be present in an amount from about 60% to about 85% by weight, such as from about 65% to about 80% by weight. The reactive compound, e.g., alkoxy silane, on the other hand, is generally present in an initial amount sufficient to form the graft reaction product and is less than about 2% by weight, such as from about 0.2% to about 2% by weight of the initial ingredients combined, such as from about 0.3% to about 1% by weight of the initial ingredients combined.

In still other embodiments, the polymer composition may contain the polyaryl-ether-ketone resin in an amount greater than about 50% by weight, such as in an amount greater than about 60% by weight, such as from about 60% by weight to about 90% by weight, such as from about 60% by weight to about 80% by weight. When the polymeric composition contains generally greater than 50% by weight of the polyaryl-ether-ketone resin, the metal endgroup content of the polyarylene sulfide resin can generally be relatively low such as from about 50 ppm to about 900 ppm. In one particular embodiment, for instance, the metal endgroup content of the polyarylene sulfide resin may be from about 50 ppm to about 500 ppm. In this embodiment, the resulting polymeric composition can display unexpectedly improved tensile properties, including tensile strength and tensile elongation.

The melt-processed polymer compositions made according to the present disclosure are homogeneous, compatibilized alloys and thus exhibit excellent tensile strength, even after being subjected to high temperatures for prolonged periods of time. For example, in one embodiment, the polymer composition may exhibit at least 75% tensile strength retention after 500 hours of aging at 230° C. (based upon the original tensile strength of the polymer). In other embodiments, the polymer composition may exhibit greater than 85% tensile retention, such as greater than 90% tensile retention after 500 hours at 230° C.

The actual tensile strength of the polymer composition after 500 hours at 230° C., for instance, may be greater than about 55 MPa, such as greater than about 60 MPa, such as even greater than about 70 MPa in one particular application.

Per the preferred embodiments, the reactive compound, e.g., alkoxy silane reacts with the polyaryl-ether-ketone resin under melt-processing conditions of elevated temperature and mechanical shear to make a polymeric reaction product. In the absence of the reaction between the silane with the polyarylene sulfide and/or polyaryl-ether ketone under melt-processing conditions, a homogeneous mass is not obtainable, and loss of initial physical properties after heat aging increases. Accordingly, the melt-processed blends of this invention can contain the reaction product of the alkoxy silane with the polyaryl-ether-ketone resin. The melt-processed blends of this invention can also contain polyarylene sulfide chains having polyaryl-ether-ketone chains grafted thereto. For instance, the polymeric blends of this invention can contain (a) from 15 weight percent to 80 weight percent of a polyarylene sulfide resin, (b) from 10 weight percent to 75 weight percent of a polyaryl-ether-ketone resin, and (c) from 2 weight percent to 40 weight percent of polyarylene sulfide chains having polyaryl-ether-ketone chains grafted thereto. Such compositions will typically be comprised of (a) from 30 weight percent to 70 weight percent of a polyarylene sulfide resin, (b) from 15 weight percent to 65 weight percent of a polyaryl-ether-ketone resin, and (c) from 5 weight percent to 20 weight percent of polyarylene sulfide chains having polyaryl-ether-ketone chains grafted thereto Such compositions will more typically contain (a) from 35 weight percent to 60 weight percent of a polyarylene sulfide resin, (b) from 20 weight percent to 60 weight percent of a polyaryl-ether-ketone resin, and (c) from 5 weight percent to 10 weight percent of polyarylene sulfide chains having polyaryl-ether-ketone chains grafted thereto.

The melt-processed polymeric compositions of this invention are valuable in a wide variety of applications where high tensile strength, high modulus, good chemical resistance, flexibility and good thermal characteristics are desired. For instance, the polymeric compositions of this invention are particularly valuable in coating wires to make insulated wires for electrical applications. Insulated wires can be manufactured with the polymeric compositions of this invention using conventional equipment and standard extrusion coating techniques. Such techniques typically involve feeding a bare wire of a good electrical conductor, such as copper or aluminum, through a straightener and a preheater into a cross-head die. The heated wire is coated in the cross-head die and is then typically fed into a water bath to cool it prior to being collected on a spool.

Tubing type cross-head dies that can be used in the practice of this invention are described by U.S. Pat. No. 4,588,546. The teachings of U.S. Pat. No. 4,588,546 are incorporated herein by reference for the purpose of describing the kinds of tubing type cross-head dies and the general procedures that can be utilized in coating wires to make insulated wires in accordance with this invention. In such procedures the bare wire is normally preheated to a temperature which is above the melting point of the polymeric composition being used to coat the wire to insure that the polymer composition adheres to the wire. After being preheated the bare wire is fed into the back of the cross-head die where it is covered circumferentially with the molten polymeric composition. After exiting the cross-head die the coated wire can be exposed to an air or gas flame for surface annealing and is then rapidly cooled to below the melting point of the polymeric composition. This cooling step is normally carried out in a bath of cold water. The coated wire is subsequently collected on spools as a finished product.

The polymeric composition surrounding the conductor in such an embodiment is comprised of the melt-reaction product of a polyarylene sulfide, a polyaryl-ether-ketone, and a reactive compound, e.g., an alkoxy silane. The composition may contain graft copolymer of polyarylene sulfide having polyaryl-ether-ketone chains grafted thereto and a reaction product of polyarylene sulfide and an alkoxysilane.

The melt-processed polymeric compositions disclosed can be used neat or with conventional additives, for example organic or inorganic fibers, particulate fillers, other polymers, pigments, nucleating agents and stabilizers. They can be shaped in conventional ways to produce for example fibers, films or granules or more complicated articles. When the polymers are incorporated with fibers of glass or carbon or alumina at a concentration of 5-40% by volume, the resulting composition is especially useful in making articles by injection molding. In such compositions the fibers are of length typically 0.5 to 5.0 mm.

Conventional shaping processes for forming articles out of the melt-processed compositions include, extrusion, injection molding, blow-molding, thermoforming, foaming, compression molding, hot-stamping, fiber spinning and the like which are known. Among the many shaped articles that can be formed, there are structural and non-structural shaped parts, well suited especially for appliance, electrical, electronic, fibrous webs, and automotive engineering thermoplastic assemblies. Exemplary automotive shaped plastic parts are suitable for under the hood applications, including fan shrouds, supporting members, wire and cable jacketing, covers, housings, battery pans, battery cases, ducting, electrical housings, fuse buss housings, blow-molded containers, nonwoven or woven geotextiles, baghouse filters, membranes, pond liners, to name a few. Other useful articles besides moldings, extrusion and fibers include wall panels, overhead storage lockers, serving trays, seat backs, cabin partitions, window covers, electronic packaging handling systems such as integrated circuit trays, to name a few.

Melt-processed compositions of this invention are also useful to coat metal bodies. U.S. Pat. No. 4,910,086 describes the process of preparing such coated articles. The teachings of U.S. Pat. No. 4,910,086 are incorporated herein by reference in their entirety.

The compositions may be further comprised of polyarylene thioether ketone. U.S. Pat. Nos. 4,873,283, 4,895,892, 4,895,912, 4,910,086, 4,975,479, and 5,095,078 describe the process of making polyarylene thioether ketone and are incorporated herein by reference.

The morphology of the PPS and PEEK phases may be different depending on their relative compositional and melt viscosity ratios. At lower PEEK ratios, the PEEK may be the dispersed phase and at higher PEEK ratios, PEEK may be the continuous phase. At intermediate ratios, the PEEK and PPS phases may be co-continuous. It is desirable for the PEEK to be either the dispersed or the continuous phase. The average domain sizes of the dispersed phases will preferably be lower than 50 microns, more preferably below 10 micron, and most preferably below 3 micron.

The melt-processed, homogeneous polymeric composition of this invention can be utilized in manufacturing microfibers, long-fibers, long-fiber reinforced composite plastic structures and multi-component fibers. The blends of this invention can be utilized in manufacturing microfibers utilizing the general technique described by U.S. Pat. No. 5,695,869, the teachings of which are incorporated herein by reference in their entirety with respect to techniques for manufacturing microfibers. The technique described by U.S. Pat. No. 6,949,288 can be utilized manufacturing multi-component fibers with the blends of this invention wherein a polymeric blend of this invention is used in conjunction with an isotropic semi-crystalline polyester or a polyolefin resin. The teachings of U.S. Pat. No. 6,949,288 are incorporated herein by reference for the purpose of teaching techniques for manufacturing multi-component fibers. U.S. Pat. No. 6,794,032 discloses a technique for manufacturing long-fiber reinforced polyolefin plastic structures wherein the long-fibers utilized have a length of ≥3 mm. The teachings of U.S. Pat. No. 6,794,032 are incorporated herein by reference for the purpose of teaching techniques for making such long-fiber reinforced plastic structures. U.S. Pat. No. 7,060,326 describes a process for making aluminum conductor composite core reinforced cable. The teachings of U.S. Pat. No. 7,060,326 are incorporated herein by reference for the purpose of disclosing a method of making such composite cores. In one embodiment, the invention is directed to a continuous, parallel carbon fiber-reinforced member comprising PAN-based carbon fibers impregnated with a melt-processed composition formed by combining polyarylene sulfide (a) polyaryl-ether-ketone resin (b), a reactive compound (c), and other lubricating type additives such as ethylene acrylic acid copolymer wherein the compound compatibilizes (a) and (b) into a homogeneous mass.

The preferred form of the melt-processed composition is by way of re-melting and impregnating reinforcing fibers in a continuous process. Such fibers suitable to provide reinforcement for the melt-processed composition include polymer fibers with melting or softening point above 300° C., and polypthalamide fibers which do not melt, e.g., Kevlar®. Other reinforcing materials suitable for use are wollastonite, chopped glass fibers, glass fiber ravings, chopped carbon fibers, continuous fiber rovings, cut metal fibers, continuous metal ravings, e.g. SS. The amount of the reinforcing fiber present in the fiber-reinforced structures made using the melt-processed compositions of the invention may moreover be from 5 to 70% by weight, more typically from 20% -65% by weight of fiber to the total weight of the reinforced composition. Glass fiber rovings (tows) have filament diameters of from 8 to 25 µm and with weight of from 500 to 4400 g per 1000 m. The fibers are surface-treated with appropriate sizings in a manner known per se and available commercially. Preferred continuous fibers used herein have a high yield or small K numbers. Carbon tow fibers have a diameter of about 5-10 µm each. The tow is indicated by its yield or K number. Fiber tows of the present invention for carbon may be 2K and up, but more preferably from 4K to about 50K. The more preferred number of fiber ends per roving can run from 8-24, e.g., 8K, 12K, and 24 k ravings. Preference is given to the use of 8 k-12 k wound fiber bundles which are bundled, dried, and wound onto packages (direct roving). Glass fiber tows may have 50 yield and up, but more preferably from about 115 yield to about 1200 yield.

According to a preferred embodiment continuous rods and tapes are formed using medium, high, or ultra-high modulus PAN-based carbon fiber ravings, e.g., with a modulus of elasticity within the range of about 12 Msi to about 47 Msi; a coefficient of thermal expansion within the range of about $-0.7 \times 1^{-10}$ m/m/° C. to about 0 m/m/° C.; and a yield elongation percent within the range of about 1.0% to 3%. A monolithic continuous fiber rod containing from 50-65 wt. % carbon and 35% -50% of the polymer composition can achieve tensile strength of 160 Ksi to about 400 Ksi; a modulus of elasticity of 7 Msi to about 37 Msi; a continuous operating temperature capability of from 170° C. to 220° C.; and a coefficient of thermal expansion of about $-0.6 \times 10^{-4}$ m/m/° C. to about $6 \times 10^{-4}$ m/m/° C.

In a preferred embodiment, continuous-fiber-reinforced structures are formed by the pultrusion process, where generally the following steps are taken:
I) sized fiber bundles are spread, and then directed through a heated bath containing molten melt-process composition, or through a heated die which is charged with the melted composition which was previously melt-processed to a uniform, homogenous state;
II) in intimate contact with the polymer melt, the fiber bundles are guided along pins, or wave-like paths, to promote a high degree of wetting, and these ravings exit the bath or die through orifices, slits and the like to form a pre-designed profile shape, including a tape or rod as is conventionally practiced in the thermoplastic pultrusion art;
III) the impregnated fiber bundles are cooled;
IV) the fiber bundles may be shaped prior to solidification, that is, postformed;
V) any number of shaped impregnated fiber bundles may be immediately consolidated, or combined with re-heated impregnated ravings previously formed; and may be further re-shaped, or wound on spools as tapes or rods, or cut through the length of the structure perpendicular to the fiber orientation direction. Preferably the impregnated profiles are consolidated into a larger monolithic, continuous composite.

The impregnation of the fiber bundles with synthetic polymer, for example via pultrusion in step I) of the above process, may also take place by other suitable processes. For example, the fibers may be impregnated by a process in which the fiber bundle is saturated by a matrix material, where the fiber bundle is laid onto carrier equipment, and wherein the carrier equipment, together with the fiber bundle lying thereon, is conducted through impregnating equipment. A process of this type is described in EP 756 536.

The fiber may also be impregnated by a process in which a plastifying extruder is used and a fiber strand is conducted by way of guide apertures and preheating equipment and is wetted with the re-melted alloy of the present invention in an impregnating apparatus and then is introduced into the plastifying extruder in which the individual fibers are chopped and mixed, the mixture being discharged in the form of a fiber-reinforced synthetic polymer composition capable of further processing, wherein the following steps are used:
a) passing by way of coating nozzles into the inlet of the plastifying extruder, and preferably parallel to the extruder axes and approximately tangentially, the fiber strand is wound up onto an extruder screw and around the extruder screws in an advancing direction, and also drawn into holes in the extruder barrel, whose diameter has been enlarged by at least four times the thickness of the fiber strand, where
b) in the inlet the right-hand coating nozzle directly applies a film of synthetic polymer to one flat side of the fiber strand, while application to the second flat side takes place indirectly by pressing the fiber strand into the liquid film of synthetic polymer previously applied from the left-hand coating nozzle to the screw, whereupon the individual continuous-filament fibers are subjected to impregnating or penetrating action at the extruder screws on both flat sides of the fiber strand in an inlet and impregnating section and these sides are wetted or saturated by the liquid films of synthetic polymer,
c) and then the fiber strand or the individual fibers thoroughly saturated or thoroughly impregnated with synthetic polymer are passed out of the inlet and impregnation section by way of a cutting edge into the short discharge and conveying section of a reduced-diameter barrel, and thus chopped into substantially predetermined lengths. An example of the process of this type is described in DE 198 36 787.

The processes described herein for forming continuous fiber-reinforced composites using the alloy of the invention can thus provide continuous rod-shaped structures of a predetermined cross-directional profile shape. The length of a cut rod-shaped structure embodiment is from 3 to 100 mm, preferably from 4 to 50 mm, and particularly preferably from 5 to 15 mm. The diameter of the cut rod-shaped structure, also termed a pellet, is from 1 to 10 mm, preferably from 2 to 8 mm, and particularly preferably from 3 to 6 mm.

Continuous lengths of rods or tapes typically are more than 100 m, especially more than 500 m in length, and may include spliced sections of individual rovings within a consolidated rod. In one embodiment, 2 to 15 impregnated rovings are consolidated in a tapered sizing die having a round profile exit cross-directional shape to make most practical monolithic continuous rods having 0.235" to 0.4" diameters.

A preferred continuous core comprises carbon fiber and the melt-processed composition formed by processing multiple consolidated rovings at the same time. For example 7 or 14 consolidated rods may be formed by consolidating from 1-5 impregnated rovings per each rod at the same time. These could be configured a number of different ways such as consolidated in parallel, consolidated in staggered, or two parallel arrays, etc. The best arrangement is dictated by width restrictions, whether a polymeric capping is added on each rod, and optimal feed-in to the forming die.

The formulations described above can also be ground to a smaller particle size within a range of 5 to 500 microns. Powder impregnation processes are known and taught in prior art. Powder impregnation requires cryogenically ground polymer. The cryogenically ground polymer particles are combined with continuous fiber reinforcements in a fluidized bed, then heated, formed and cooled to the final product form.

The surprising improvement in mechanical and thermal properties achieved in the fiber-reinforced composites according to the invention are achieved in the pultrusion by maintaining a minimum of 20 feet per minute roving speed, and more preferably 30 feet per minute and above, with a wave-die impregnation zone less than 1 meter in length along the machine direction. Excellent, high tensile strength is achieved at a fiber content of the long-fiber-reinforced two-phase incompatible matrix-fiber composite from 50% -70%, and a void content of less than 3%.

Coated metal bodies can be made by substituting the polymeric composition of this invention for the resin coating material used in U.S. Pat. No. 4,910,086 for making such coated metal bodies. More specifically, such coated metal bodies are comprised of a metal base or a metal base having an undercoat of an inorganic and/or organic material and at least one coating layer formed on the metal base or the undercoat, wherein the coating layer has a thickness of 5 μm to 1000 μm, and wherein the coating layer is comprised of the polymeric composition of this invention. The teaching of U.S. Pat. No. 4,910,086 are incorporated herein by reference for the purpose of illustrating such coated metal bodies and techniques for making such coated metal bodies.

In another embodiment of this invention the melt-processed composition is formed by the use of a reactive compound selected from an organotitanium compound, an organozirconium compound, and an organosilicon compound as suitable alternatives to alkoxy silane compounds The reactive compounds and alkoxy silane graftlinking agents act in a manner whereby polymeric chains of the polyarylether ketone resin and/or polyarylene sulfide are grafted onto polymeric chains of the polyarylene sulfide resin. Accordingly, this graftlinking reaction results in the formation of a graft copolymer comprising the residue of the polyarylether ketone resin, the polyarylene sulfide resin, and the graftlinking agent (the organotitanium compound, the organozirconium compound, or the organosilicon compound).

The neoalkoxy organotitanates that can be employed in the practice of this invention are of the structural formula:

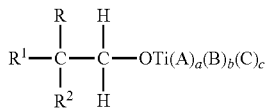

wherein R and $R^1$ can be the same or different and represent a monovalent alkyl, alkenyl, alkynyl, aralkyl, aryl or alkaryl group of 1 to 20 carbon atoms, or an ether substituted derivative thereof, or a halogen, wherein $R^2$ represents a monovalent alkyl, alkenyl, alkynyl, aralkyl, aryl or alkaryl group of 1 to 20 carbon atoms, or an ether substituted derivative thereof, or an oxy derivative or an ether substituted oxy derivative thereof or a halogen, wherein A, B and C represent a monovalent aroxy group, a thioaroxy group, a diester phosphate group, a diester pyrophosphate group, a oxyalkylamino group, a sulfonyl group, or a carboxyl group, wherein a, b, and c represent integers, and wherein the sum of a, b, and c is 3. The various R, $R^1$ and $R^2$ may each contain up to three ether oxygen or halogen substituents, provided the total number of carbon atoms for each such R group does not exceed 20, inclusive of the carbon atoms contained in substituent portions. A, B and C may be an aroxy (ArO—), thioaroxy (ArS——), diester phosphate ($(R^3O)(R^4O)P(O)O$—), diester pyrophosphate ($(R^3O)(R^4O)P(O)OP(O)$), oxyalkylamino ($R^5R^6NR^7O$—), sulfonyl (ArS(O)$_2$O—) or carboxyl (RC(O)O—). Each group may contain up to 30 carbon atoms.

Ar, in the above formulas, may be a monovalent aryl or alkaryl group having from 6 to about 20 carbon atoms, optionally containing up to 3 ether oxygen substituents, and substituted derivatives thereof wherein the substitutions are up to a total of three halogens or amino groups having the formula $NR^8R^9$ wherein $R^8$ and $R^9$ are each hydrogen, an alkyl group having 1 to 12 carbon atoms, an alkenyl group having 2 to 8 carbon atoms, a cycloalkyl group having from 3 to 12 carbon atoms, and an aryl group having from 6 to 12 carbon atoms; and $R^3$ and $R^4$ may each be the same group as R, $R^1$ and Ar, $R^5$ and $R^6$ may be hydrogen, an alkyl or aminoalkyl group having from 1 to 15 carbon atoms and $R^7$ may be an alkylene group having from 1 to 6 carbon atoms or an arylene group having from 6 to 10 carbon atoms or a combination thereof; and a+b+c is equal to 3.

Particularly preferred examples of the R, $R^1$ and $R^2$ groups are alkyl having 1 to 8 carbon atoms; aralkyl having 6 to 10 carbon atoms such as benzyl; the aryl and alkaryl groups having from 6 to 10 carbon atoms including phenyl, naphthyl, tolyl, xylyl; and the halogen-substituted bromophenyl; and the allyloxy-substituted alkyl having from 4 to 20 carbon atoms and the allyloxy-substituted aryl having from 9 to 20 carbon atoms. Where $R^2$ is an oxy derivative, the most preferred compounds are the alkoxy derivatives having from 1 to 3 carbon atoms and the phenoxy group.

Preferred $R^3$ and $R^4$ groups are alkyl groups having 1 to 12 carbon atoms, aryl and alkaryl groups having from 6 to 12 carbon atoms and ether-substituted alkyl having from 3 to 12 carbon atoms.

Examples of specific, R, $R^1$. $R^2$. $R^3$ and $R^4$ groups are: methyl, propyl, cyclohexyl, 2,4-dimethoxybenzyl, 1-methyl-4-acenaphthyl-2-ethyl-2-furyl and methallyl. $R^2$, in addition, may be methoxy, phenoxy, naphthenoxy, cyclohexene-3-oxy, 4-isobutyl-3-methoxy, 1-phenanthroxy and 2,4,6-trimethylphenoxy.

Examples of A, B and C ligands useful in the practice of this invention are likewise numerous. These include aryl and thioaryl ligands such as phenoxy, 2,4-dimethyl-1-naphthoxy, 3-octyl-1-phenanthroxy and 3,5-diethyl-2-thioanthryl and 2-methyl-3-methoxy thiophenyl as well as diester phosphates such as dibutyl, methylphenyl, cyclohexyl, lauryl and bis-methoxyethoxyethyl phosphate and their pyrophosphate analogs as well as aryl sulfonyl groups such as phenylsulfonyl, 2,4-dibutyl-1-naphthalene sulfonyl and 2-methyl-3-ethyl-4-phenanthryl sulfonyl.

Particularly effective are carboxyl groups such as acetyl, methacryl, stearyl, 4-phenoxy and 4-phenoxy butyl. Some representative examples of the neoalkoxy organotitanates that can be employed in the practice of this invention include:
$(CH_3)_3CCH_2OTi[OC(O)C_{17}H_{35}]_3$,
$(CH_3)_2(C_6H_5)CCH_2OTi(OC_6H_5)_2[OC(O)C_6H_5]$,
$(CH_3\!=\!\!C(CH_3)CH_2O)_2(C_2H_5)CCH_2OTi[2SC_6H_4$—N-$3C_2H_5]_2(OC_6H_4C(CH_3)_2C_6H_5]$,
$(C_6H_{11}O)(iso\text{-}C_{12}H_{25})_2CCH_2OTi[OS(O)_2C_6H_4C_{12}H_{25}]_3$,
$(CH_2\!=\!\!CHCH_2O)(C_3H_7)(C_2H_5)CCH_2OTi[OP(O)(OC_4H_9)OP(O)(OH)OC_4H_9)]_3$,
$(CH_3)(HC\!=\!\!CCH_2O)(C_6H_5)CCH_2OTi[OP(O)(OC_2H_4OCH_3)(OCH_3)]_2[OC_6H_4\text{-}p)\text{-}C_2H_5]$,
$(C_6H_{11})(iso\text{-}C_3H_7)(C_4H_9O)CCH_2OTi[S(O)_2C_6H_4$—O—$CH_3][SC_6H_5]_2$,
$(CH_3)(C_6H_5CH_2O)(C_2H_5)CCH_2OTi[OP(O)(OC_6H_4\text{-}p\text{-}CH_3)(OC_2H_4OCH_3)]$,
$[OP(O)(OH)OP(O)(OC_3H_7)_2]_2$,
$(C_2H_5)(C_3H_7)(CH_2\!=\!\!CHO)CCH_2OTi[OC(O)neo\text{-}C_9H_{17}]_3$,
$[C(CH_3)_2\!=\!\!C(C_6H_5)OCH_2]_2(iso\text{-}C_3H_7)CCH_2OTi[OC_{10}H_7][OC(O)CH_2CH_3]_2$,
$(C_2H_5OCH_2)(CH_3)(C_6H_5)CCH_2\ OTi[OC_2H_4NHCH_3]_3$,
$(CH_3)_2(C_4H_9)CCH_2OTi[OC_3H_6N(C_6H_5)C_4H_8C_{10}H_7]_2[OC(O)CH_3]$.

Specific neoalkoxy organotitanates that can be employed in the practice of this invention and methods for the synthesis thereof are disclosed in U.S. Pat. No. 4,600,789. The teachings of U.S. Pat. No. 4,600,789 are incorporated by reference herein.

The titanium and zirconium compounds that can be utilized in the practice of this invention are of the structural formula:

$$(R^1—O—)_y—X—(—O—R^2—W)_z$$

wherein each $R^1$ represents an alkyl radicals having from 1 to 8 carbon atoms, wherein $R^2$ represents a divalent radical selected from the group consisting of alkylenes having 1 to 15 carbon atoms, arylene and alkyl substituted arylene groups having 6 to 10 carbon atoms, wherein W represents an epoxy group; wherein y represents an integer of from 1 to 3, wherein z represents an integer from 1 to 3, wherein the sum of y and z equals 4, and wherein X represents titanium or zirconium. Preferably, each R1 is an alkoxy radical having from 1 to 3 carbon atoms, R2 is a divalent radical selected from the group consisting of alkylenes having from 1 to 5 carbon atoms, y is 3, and z is 1, and X represents titanium. Specific titanium and zirconium compounds that can be employed in the practice of this invention and methods for the synthesis thereof are disclosed in U.S. Pat. No. 6,870,064. The teachings of U.S. Pat. No. 6,870,064 are incorporated by reference herein.

The organosilicon compounds that can be employed in the practice of this invention are of the structural formula:

$$Z\text{-Alk-}S_n\text{-Alk-}Z \quad (I)$$

in which Z is selected from the group consisting of

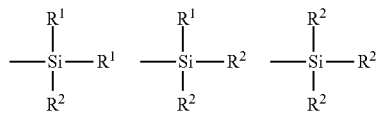

where $R^1$ is an alkyl group of 1 to 4 carbon atoms, cyclohexyl or phenyl; wherein $R^2$ is alkoxy of 1 to 8 carbon atoms, or cycloalkoxy of 5 to 8 carbon atoms; and wherein Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxydiethoxysilylethyl)tetrasulfide, 2,2'-bis(tripropoxysilylethyl)pentasulfide, 3,3'-bis(tricyclonexoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tetrasulfide, 3-methoxy ethoxy propoxysilyl3'-diethoxybutoxysilylpropyltetrasulfide, 2,2'-bis(dimethyl methoxysilylethyl)disulfide, 2,2'-bis(dimethyl sec.butoyxysilylethyl)trisulfide, 3,3'-bis(methyl butylethoxysilylpropyl)tetrasulfide, 3,3'-bis(di t-butylmethoxysilylpropyl)tetrasulfide, 2,2'-bis(phenyl methylmethoxysilylethyl)trisulfide, 3,3'-bis(diphenyl isopropoxysilylpropyl)tetrasulfide, 3,3'-bis(diphenyl cyclohexoxysilylpropyl)disulfide, 3,3'-bis(dimethyl ethylmercaptosilylpropyl)tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec.butoxysilylpropyl)disulfide, 3,3'-bis(propyl diethoxysilylpropyl)disulfide, 3,3'-bis(butyl dimethoxysilylpropyl)trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide, 3,3'-bis(dimethoxyphenylsilyl-2-methylpropyl)disulfide.

The preferred sulfur containing organosilicon compounds are the 3,3'-bis(trimethoxy or triethoxy silylpropyl)sulfides. The most preferred compound is 3,3'-bis(triethoxysilylpropyl)tetrasulfide. Therefore as to formula I, preferably Z is

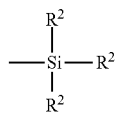

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

Optional additional additives can be combined during the melt-processing of the composition include and yet not adversely affect the desired properties thereof. Exemplary optional materials include, without limitation, antimicrobials, pigments, lubricants, antioxidants, stabilizers, surfactants, waxes, flow promoters, solid solvents, particulate fillers, and other materials added to enhance properties and processability and employed in conventional amounts. Of the particulate fillers there is mentioned carbon black, silica, quartz powder, glass bead, glass powder, silicates such as calcium silicate, aluminum silicate, kaolin, talc, clay, diatomaceous earth and wollastonite, metal oxides such as iron oxide, titanium oxide, zinc oxide and alumina, metal carbonates such as calcium carbonate and magnesium carbonate, metal sulfates such as calcium sulfate and barium sulfate, silicon carbide, silicon nitride, boron nitride and metal powders,antioxidants typically at 0.1 to 4.0% by weight, preferably from 0.15 to 3.0% by weight, particularly preferably from 0.2 to 2.0% by weight. There may be a UV stabilizer at 0.1 to 4.0% by weight, preferably from 0.15 to 3.0% by weight, and particularly preferably from 0.2 to 2.0% by weight.

This invention is illustrated by the following examples that are merely for the purpose of illustration of preferred embodiments and are not to be regarded as limiting the scope of the invention or the manner in which it can be practiced. Unless specifically indicated otherwise, parts and percentages are given by weight.

EXAMPLES 1-27

The examples provided below in the following tables were prepared by melt mixing in a continuous mixing extruder (Haake® or twin-screw extruder) by feeding the ingredients in the feed throat, except the glass fiber which was fed downstream. Temperatures above the melting point of PEEK, namely, 340° C., were used to conduct the melt mixing. The extrudates were pelletized and injection molded for obtaining tensile/ impact specimens for physical testing.

In these experiments a TA Instruments Dynamic Analyzer (DMA) Model 2980 was used to conduct the thermal analysis for measuring the glass transition temperatures by dynamic mechanical methods. The glass transition temperature was characterized as the temperature at which a maxima in the loss modulus peak was observed. All tensile properties were tested under ISO 527 method. Heat distortions temperatures were measured under ISO 75 method.

TABLE 1

Compositions & Properties: Effect of Silane at lower PEEK/PPS ratio

| | Example | | | | | |
|---|---|---|---|---|---|---|
| | 1 | 2 | 3 | 4 | 5 | 6 |
| | (Controls) | | | | | |
| Ingredients | | | | | | |
| Fortron ® 0214B1[1] | 95 | 90 | 80 | 94.5 | 89.5 | 79.5 |
| Victrex ® 450G[2] | 5 | 10 | 20 | 5 | 10 | 20 |
| Amino Silane[3] | 0 | 0 | 0 | 0.5 | 0.5 | 0.5 |
| Tensile | | | | | | |
| Break Stress, MPa | 75.0 | 65.4 | 47.1 | 75.8 | 74.2 | 63.6 |
| Break strain, % | 2.5 | 1.9 | 1.3 | 2.5 | 2.4 | 1.9 |

Notes
[1]Polyphenylene sulfide having a high degree of linearity and having a measured melt viscosity of 1400 poise (310° C., 1200 1/s) and a measured sodium end group concentration of 81.7 parts per million (ppm). The Fortron ® 0214B1 PPS utilized in this experiment was manufactured by Fortron Industries and marketed by Ticona Polymers LLC. The sodium concentration was measured by Inductively Coupled Plasma-Optical Emission Spectrometry technique by digesting the polymer in a Nitric and Sulfuric acid mixture.
[2]Polyether ether ketone manufactured by Victrex. It has a melt flow rate (MFR) of 4 g/10 min under the condition of 400° C./2.16 kg.
[3]Dynasylan ® AMEO-Pure Silane (3-Aminopropyltriethoxysilane) manufactured by Degussa.

Examples 1, 2, and 3 are controls with increasing amounts of PEEK to 20% by weight. Examples 4, 5, and 6 are the analogous examples of this invention that contain amino silane as a compatibilizing agent. The addition of amino silane enhanced the miscibility of PEEK and PPS as is evident from the alloys of Examples 4-6 that have a higher tensile strength than their respective controls 1-3. The amino silane is believed to form graft molecules of the polyphenylene sulfide with the polyetherether ketone via reactive coupling. Due to the coupling, higher tensile strength is obtained for an improved durability and processability of the formed alloy. Some of the amino silane will selectively react or graft with the polyarylene sulfide to form the reaction product of polyarylene sulfide and the alkoxy silane.

TABLE 2

Compositions and Properties at higher PEEK proportions

| | Example | | |
|---|---|---|---|
| Ingredients | 7 | 8 | 9 (Control) |
| Fortron ® 0214B1 | 60 | 39.5 | 100 |
| Victrex ® 381G[4] | 39.5 | 60 | 0 |
| Amino Silane | 0.5 | 0.5 | 0 |
| Glass Transition (Tg) of PPS phase | 119.4 | 122.0 | 116.7 |
| Distortion Temp ° C. (HDT @ 1.8 MPa) | 136.2 | 142.9 | 107.6 |
| Tensile strength MPa | 42.5 | 89.1 | 82.2 |
| Tensile strength after 1000 Hr aging @ 200° C. | 42.7 | 84.0 | 58.6 |
| % Retention | 100 | 94 | 71 |
| Tensile Elongation % | 1.16 | 3.79 | 2.81 |
| Tensile Elongation after 1000 Hr aging at 200° C. | 1.09 | 2.57 | 1.55 |

Notes
[4]Medium viscosity polyether ether ketone manufactured by Victrex. It has a MFR of 4.5 g/10 min under the condition of 400° C./2.16 kg.

The data in Table 2 shows that Examples 7 and 8 have a glass transition temperature that is higher than the Control Example 9 that has 100% PPS, indicating some increased miscibility of the blends to make an alloy. The alloys also have a higher heat distortion temperature (HDT) than the Example 9 that contained all PPS. The alloys of this invention (Examples 7 and 8) that contain higher PEEK amounts and amino silane can be used at higher continuous use temperatures than the control with 100% PPS. Such alloys would have industrial utilities as cost-effective alternate materials to a 100% PEEK containing thermoplastic composition. Such alloys could also be used to draw fibers, such as mono-filaments and multi-filaments, for preparing woven and nonwoven fabrics with increased thermal stability. The fibers and filaments could be bicontinuous with the alloy forming the sheath or the core and the other thermoplastic material, such as high temperature nylon, polyester, or liquid crystalline polyester or liquid crystalline polyester-amide, as the core of the sheath material.

TABLE 3

Compositions and Properties of glass reinforced compounds

| | Example | | | | | | |
|---|---|---|---|---|---|---|---|
| Ingredients | 10 | 11 | 12 | 13 | 14 | 15 | 16 (Control) |
| Fortron ® 0214B1 | 47.5 | 38.5 | 32.5 | 23.5 | | | 59.5 |
| Fortron ® 0320B0[5] | | | | | 47.5 | 23.5 | |
| GATONE 5600P[6] | 12 | 21 | 27 | 36 | 12 | 36 | 0 |
| Amino Silane | 0.5 | 0.5 | 0.5 | 0.5 | 0.5 | 0.5 | 0.5 |
| Glass Fiber | 40 | 40 | 40 | 40 | 40 | 40 | 40 |
| Distortion Temp ° C. (HDT @ 1.8 MPa) | 267 | 270 | 273 | 281 | 268 | 276 | 266 |
| Tensile strength MPa | 196 | 197 | 198 | 214 | 198 | 211 | 200 |
| Tensile strength after 1000 hours aging at 200° C. | 126 | 132 | 149 | 188 | 181 | 192 | 132 |
| % retention | 64 | 67 | 75 | 88 | 91 | 91 | 66 |
| Tensile Elongation % | 2.1 | 2.0 | 2.0 | 1.7 | 2.0 | 1.9 | 2.1 |

TABLE 3-continued

Compositions and Properties of glass reinforced compounds

| | Example | | | | | | |
|---|---|---|---|---|---|---|---|
| Ingredients | 10 | 11 | 12 | 13 | 14 | 15 | 16 (Control) |
| Tensile Elongation after 1000 hours aging at 200° C. | 0.9 | 1.0 | 1.1 | 1.2 | 1.5 | 1.4 | 1.0 |

Notes
[5]Fortron ® 0320 is an extrusion grade polyphenylene sulfide having a high degree of linearity with a higher sodium ion end group concentration measured at 649.5 ppm. This PPS is manufactured by Fortron Industries and marketed by Ticona Polymers LLC and it has typical melt viscosity of 2400 poise (@310° C., 1200 1/s).
[6]Gatone 5600P is an unfilled PEEK material manufactured by Gharda Polymer, India. It has a melt viscosity range of 150-210 Pa · s when measured at 400° C. and 1000 1/s shear rate.

The data in Table 3 shows that the invention is applicable to composites or reinforced products too. Higher HDT were observed across the whole experimental range, compared to the 100% PPS in Control Example 16. Significant improvement of retention of properties was also observed in Examples 12, 13, 14 and 15, that is indicative of an increase in upper or continuous use temperature.

A comparison of retention rate properties between Example 10 and 14 further proves the reactive effect of silane on a PPS grade Fortron 0214B1 that has a lower viscosity and a lower sodium ion end group concentration versus the PPS grade Fortron 0320B0 that has a higher viscosity and a higher sodium ion end group concentration. At the same PPS/PEEK polymer blend ratio, the alloy with 0320B0 which is known to have a high ionic end group concentration and higher melt viscosity retains 91% of its original tensile properties.

EXAMPLE 17

In this experiment a blend containing 50% PEEK and 50% PPS containing 0.5% silane was prepared in a twin screw extruder. This blend was determined to have a melt viscosity of 2647 poise at 360° C. and a shear rate of 1200 sec$^{-1}$. The high melt viscosity exhibited by this polymeric blend is evidence of a graft co-polymer of polyarylene sulfide and polyaryl-ether-ketone is being formed. The graft copolymer is believed to be a reaction product of polyarylene sulfide, polyaryl-ether-ketone, and an alkoxy-silane. The alkoxy silane is preferably an amino silane, most preferably, 3-aminopropyltriethoxysilane.

COMPARATIVE EXAMPLE 18

In this experiment a blend containing 50% PEEK and 50% PPS (without any silane) was prepared in a twin screw extruder. This blend was determined to have a melt viscosity of only 1836 poise at 360° C. and a shear rate of 1200 sec$^{-1}$. As can be seen the melt viscosity of the polymeric blend made in Example 17 was 44% higher than the melt viscosity of the blend made in this experiment where a silane was not included. Accordingly, this experiment shows that the presence of 0.5% of the silane greatly increased the melt viscosity of the polymer blend made.

COMPARATIVE EXAMPLE 19

In this experiment the melt viscosity of a sample of the PPS utilized in Example 17 and Comparative Example 18 was determined for comparative purposes. The PPS was determined to have a melt viscosity of less than 400 poise at 360° C. and a shear rate of 1200 sec$^{-1}$.

COMPARATIVE EXAMPLE 20

In this experiment the melt viscosity of a blend containing 99.5% PPS and 0.5% silane was determined for comparative purposes. The PPS was also determined to have a melt viscosity of less than 400 poise at 360° C. and a shear rate of 1200 sec$^{-1}$ as measured by the Dynisco Capillary rheometer. This experiment shows that it is necessary for the alkoxy silane to be present in the blend in order to increase the melt viscosity to the high level exhibited by the polymeric blends of this invention that is indicative of reactive grafting of the silane with polyarylether ketone and polyarylene sulfide. It should be noted that the polymeric blends of this invention typically exhibit a melt viscosity of over 2000 poise and can have melt viscosities of over 2500 poise.

EXAMPLES 21-25

The films were produced on a lab scale co-rotating twin screw extruder with an extrusion die at the melt temperature of 335° C.; Screw RPM of 250; rate of 7 lb/hr. The films were processed at 335° C. that is below the melting point of PEEK (340° C.).

TABLE 4

Compositions of PPS/PEEK alloy prepared for making film and filaments

| | Examples | | | | |
|---|---|---|---|---|---|
| Ingredients | 21 | 22 | 23 | 24 | 25 |
| Fortron ® 0320B0 | 84.5 | 79.5 | 74.5 | 0 | 80 |
| Fortron ® 0309B4[9] | | | | 79.5 | |
| Victrex 150G PEEK | 15 | 20 | 25 | 20 | 20 |
| Amino Silane | 0.5 | 0.5 | 0.5 | 0.5 | 0 |
| Film appearance | Good | Good | Good | Good | Poor |
| Film thickness (mm) | 0.275 | 0.23 | 0.275 | 0.32 | 0.62 |
| Filaments Extruded | Yes | Yes | Yes | Yes | Unable |

Note:
[9]Fortron 0309 is a polyphenylene sulfide having a high degree of linearity with a measured Sodium ion concentration of 664.2 ppm. This PPS is manufactured by Fortron Industries and marketed by Ticona Polymers LLC and it has typical melt viscosity of 1350 poise (@310° C., 1200 1/s).

In Example 14, that had a PPS/PEEK ratio of 80:20, a 91% retention in tensile strength was demonstrated after 1000 hours of heat aging at 200° C. Above Examples 21-24 that include Example 22 (80:20 PPS/PEEK) also demonstrate that the films with lower amounts of PEEK are processable at PPS melt processing temperatures that are below the melting point of PEEK.

Without the silane, the material of Example 25 was less uniform in melt and caused extrusion instabilities. The film uptake speed had to be reduced to maintain the form. Therefore, only a thick film could be produced.

Compositions may be used to prepare extruded articles such as stock shape, slabs, sheets, pipes, and rods. These examples show that extruded articles of good quality and appearance can be made utilizing the polymeric compositions of this invention. The graft copolymer will preferably be a reaction product of polyarylene sulfide, polyaryl-ether-ketone, and an alkoxy silane.

The filaments were produced on a Micro-melt spinning equipment with a 0.007 mil and a 0.15 mil die, at 360° C. melt temperature; a pack pressure of 800 psi and take up speed of 200 to 800 rpm. Filaments were also produced with the above formulations shown in Examples 21-25.

EXAMPLES 26-27

In these experiments the relationship between the sodium end group content of the polyphenylene sulfide utilized in the polymer blend and the tensile strength of the polymer blend was evaluated. More specifically, a blend that contained only polyphenylene sulfide having a low sodium end group content (Example 26) was compared to a blend that contained both a polyphenylene sulfide having a low sodium end group content and a polyphenylene sulfide having a high sodium end group content (Example 27). In Example 26 a blend was made with 59.5 weight percent Fortron® 0214B1 polyphenylene sulfide, 40 weight percent Victrex 381 G polyether ether ketone, and 0.5 weight percent amino silane. In Example 27, a blend was made with 29 weight percent Fortran® 0214B1 polyphenylene sulfide, 30.5 weight percent Fortran® 0320B2 polyphenylene sulfide, 40 weight percent Victrex 381 G polyether ether ketone, and 0.5 weight percent amino silane. In other words, the blend made in Example 27 was identical to the blend made in Example 26 except for the fact that 30.5 weight percent Fortran® 0320B2 polyphenylene sulfide was substituted into the blend in place of 30.5 weight percent Fortran® 0214B1 polyphenylene sulfide.

TABLE 5

Examples of composition with a blend of lower and higher Sodium Metal End Group Containing PPS at 60/40 PPS/PEEK ratios

| Ingredients | Examples 26 | 27 |
|---|---|---|
| Fortron ® 0320B0* | 0 | 30.5 |
| Fortron ® 0214B1** | 59.5 | 29 |
| Victrex 381G PEEK | 40 | 40 |
| Amino Silane | 0.5 | 0.5 |
| Tensile Strength (MPa) | 42.5 | 84.5 |

*sodium content [649.5 ppm]
**sodium content [81.7 ppm]

Example 27 that contains a blend of Fortron 0214B1 (lower metal end group) with Fortron 0320B0 (higher metal end group) has a higher initial tensile strength when compared with Example 26 that is comprised of Fortran 0214B1 (lower metal end group). Example 27 demonstrates a method of adjusting the metal end group concentration in the composition by adjusting the relative proportions of Fortran 0214B1 and Fortran 0320B0 PPS resins.

As can be seen by reviewing the data reported in Table 5, Examples 26 and 27 further demonstrated that a preferred range of metal ion content for alloy formation. The optimal properties could be achieved by adjusting two factors. These factors include (1) the overall PEEK to PPS ratio and (2) the ratio of PPS with high metal ion content to PPS with low metal ion content ratio. It would appear as if there is a benefit associated with utilizing both a PPS having a low metal end group content and PPS having a high metal end group content in the blend. The PPS having a low metal end group content will typically have a metal end group content of less than about 200 ppm. The PPS having a high metal end group content will typically have a metal end group content of greater than 300 ppm. The weight ratio of the PPS having a low metal end group content to PPS having a high metal end group content can be within the range of 4:1 to 1:4 and will typically be within the range of 2:1 to 1:2.

EXAMPLES 28-32

The following test results illustrate the effect of metal endgroup content of the polyarylene sulfide resin on the retention of strength properties of the melt-processed polymer composition. The below tests also demonstrate surprising retention of properties for the melt-processed polymer compositions containing relatively low wt. % amounts of the polyaryl-ether-ketone resin.

The examples provided below in the following tables were prepared by melt mixing in a continuous mixing extruder (Haake® or twin-screw extruder) by feeding the ingredients in the feed throat. Temperatures above the melting point of PEEK, namely, 340° C., were used to conduct the melt mixing. The extrudates were pelletized and injection molded for obtaining tensile/impact specimens for physical testing.

The acid washed products are produced by the following procedure. A pre-weight amount of FORTRON® 0320B0 flakes was first mixed with ethanol. The flakes were then filtered and washed with distilled water twice. A preset amount of glacial acetic acid was then added into the flake/distilled water slurry. The slurry was stirred and the reaction times range 40 minutes to 2 hours. After that, the flakes were washed again with distilled water twice before finally deionized water wash. All flakes were dry in an oven at 180 ° F. for at least 24 hours.

All tensile properties were tested under ISO 527 method. The Sodium contents of PPS and other experimental materials given below are obtained using inductively coupled plasma/optical emission spectrometry (ICP-OES, Vista MPX made by VARIAN). Polymer samples are first digested with concentrated sulfuric acid (94-98%) and nitric acid (70%) in a closed vessel microwave digester (MARS made by CEM Corporation). The digested sample is diluted with Nano water prior to the ICP-OES analysis. The dilution factor is 480. The standard deviation of Na content measurement for this set of experiments is calculated to be 17 ppm.

TABLE 6

Compositions & Properties: Effect of Na content on property retention

| Ingredients | Example 28 | 29 | 30 | 31 | 32 |
|---|---|---|---|---|---|
| Fortron ® 0214B1[1] | 77 | | | | |
| Fortron ® 0320B0[2] | | 77 | | | |
| Acid washed product 1 | | | 77 | | |
| Acid washed product 2 | | | | 77 | |
| Acid washed product 3 | | | | | 77 |
| Victrex ® 150G[3] | 22.5 | 22.5 | 22.5 | 22.5 | 22.5 |
| Amino Silane[4] | 0.5 | 0.5 | 0.5 | 0.5 | 0.5 |
| Sodium (ppm)[5] | 40 | 399 | 303 | 282 | 263 |
| Chlorine (ppm)[5] | 600 | 410 | 570 | 560 | 490 |
| Tensile strength (MPa) | | | | | |
| Without heat aging | 72.5 | 68.3 | 71.2 | 75.1 | 72.5 |
| Standard Deviation | 0.3 | 0.5 | 0.4 | 0.6 | 0.8 |
| After 500 hours @ 230° C. | 52.9 | 70.8 | 73.4 | 68.2 | 48.6 |
| Standard Deviation | 13.9 | 8.1 | 2.4 | 6.4 | 17.3 |
| % Tensile Retention | 75% | 103% | 103% | 90% | 67% |

Notes
[1]Polyphenylene sulfide having a high degree of linearity and having a measured melt viscosity of 1400 poise (310° C., 1200 1/s). The Fortron ® 0214B1 PPS utilized in this experiment was manufactured by Fortron Industries and marketed by Ticona Polymers LLC.
[2]Fortron ® 0320 is an extrusion grade polyphenylene sulfide having a high degree of linearity. This PPS is manufactured by Fortron Industries and marketed by Ticona Polymers LLC and it has typical melt viscosity of 2400 poise (@310° C., 1200 1/s).
[3]Polyether ether ketone manufactured by Victrex. It has a melt flow rate (MFR) of 44 g/10 min under the condition of 400° C./2.16 kg.
[4]Dynasylan ® AMEO-Pure Silane (3-Aminopropyltriethoxysilane) manufactured by Degussa.
[5]The sodium endgroup content and the total residual chlorine content reported are for the initial polyphenylene sulfide resin prior to the melt-processing to form the examples.

As shown above, in this embodiment, better results were obtained when the metal endgroup content was at least about 270 ppm. The tensile strength data from the above table is also illustrated in FIG. 1. As shown above in the table and on FIG. 1, when the metal endgroup content was above 270 ppm for the polyphenylene sulfide resin, the resulting composition exhibited dramatically improved tensile retention properties. Of particular advantage, the surprising effect on tensile retention properties was exhibited for compositions containing polyether ether ketone in relatively low amounts, such as in amounts less than 25% by weight.

While certain representative embodiments and details have been shown for the purpose of illustrating the subject invention, it will be apparent to those skilled in this art that various changes and modifications can be made therein without departing from the scope of the subject invention.

What is claimed is:

1. A shaped article, wherein the shaped article comprises a melt-processed, polymeric composition formed by combining (a) a linear polyarylene sulfide resin having a metal endgroup content of from about 50 ppm to about 2000 ppm and having a melt viscosity of less than 6,500 poise at 310° C. and a shear rate of 1200 1/s as measured in a capillary rheometer, (b) a polyaryl-ether-ketone resin, and, a reactive compound wherein (c) a graft copolymer of (a) and/or (b) is formed rendering the composition homogeneous, wherein the polyaryl-ether-ketone resin is present in the composition in an amount from about 60% to about 90% by weight, the polyarylene sulfide resin is present in the composition in an amount from about 10% to about 40% by weight, and the reactive compound is an alkoxy silane present in the composition in an initial amount from about 0.2% to about 2% by weight, wherein the composition has a tensile strength retention after 500 hours at 230° C. of at least about 75%.

2. A shaped article as specified in claim 1, wherein the polyarylene sulfide resin has a total residual chlorine content of from 300 ppm to 1200 ppm.

3. A shaped article as specified in claim 1, wherein the polyaryl-ether-ketone resin is polyetheretherketone resin.

4. A shaped article as specified in claim 1, wherein the polyarylene sulfide resin is of the formula:

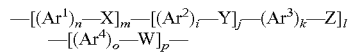

wherein $Ar^1$, $Ar^2$, $Ar^3$, and $Ar^4$ are the same or different and are arylene units of 6 to 18 carbon atoms; W, X, Y, and Z are the same or different and are bivalent linking groups selected from —$SO_2$—, —S—, —SO—, —CO—, —O—, —COO— or alkylene or alkylidene groups of 1 to 6 carbon atoms and wherein at least one of the linking groups is —S—; and n, m, i, j, k, I, o, and p are independently zero or 1, 2, 3, or 4, subject to the their sum total is not less than 2.

5. A shaped article as specified in claim 1, wherein the alkoxy silane is an amino silane.

6. A shaped article as specified in claim 5, wherein the alkoxy silane is 3-aminopropyltriethoxysilane.

7. A shaped article as specified in claim 1, wherein the graft copolymer comprises polyarylene sulfide chains having polyaryl-ether-ketone chains grafted thereto, and wherein the polymeric composition has a continuous phase and discontinuous phase.

8. A shaped article as specified in claim 7, wherein said continuous phase is the polyarylene sulfide resin.

9. A shaped article as specified in claim 7, wherein said continuous phase is the polyaryl-ether-ketone resin.

10. A shaped article as specified in claim 1, wherein the metal in the metal endgroup is an alkali metal selected from the group of sodium, lithium and potassium.

11. A shaped article as specified in claim 1, wherein the polymeric composition further comprises a reinforcing filler.

12. A shaped article as specified in claim 1, wherein the shaped article is formed by a molding, spinning, or extrusion process.

13. A shaped article as specified in claim 1, wherein the shaped article is a coated wire.

14. A shaped article as specified in claim 13, wherein the coated wire comprises an electrical conductor and an outer layer of the melt-processed polymeric composition.

* * * * *